US011290541B2

(12) United States Patent
Lin et al.

(10) Patent No.: US 11,290,541 B2
(45) Date of Patent: Mar. 29, 2022

(54) SYNCHRONOUS CLIENT-SIDE LOG SERVICE

(71) Applicant: International Business Machines Corporation, Armonk, NY (US)

(72) Inventors: Zhi Gang Lin, Beijing (CN); Li Xiang, Beijing (CN); Peng Chang, Beijing (CN); Chun Ling Li, Beijing (CN); Dan Li, Beijing (CN); Xiao Feng Zhang, Beijing (CN); Mu Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 16/357,367

(22) Filed: Mar. 19, 2019

(65) Prior Publication Data

US 2020/0304577 A1 Sep. 24, 2020

(51) Int. Cl.
*H04L 29/08* (2006.01)
*G06F 16/25* (2019.01)
*H04L 67/141* (2022.01)
*H04L 67/143* (2022.01)
*H04L 67/10* (2022.01)
*H04L 67/01* (2022.01)

(52) U.S. Cl.
CPC .......... *H04L 67/141* (2013.01); *G06F 16/252* (2019.01); *H04L 67/143* (2013.01); *H04L 67/10* (2013.01); *H04L 67/42* (2013.01)

(58) Field of Classification Search
CPC ..... H04L 67/141; H04L 67/143; H04L 67/10; H04L 67/42; G06F 16/252
USPC ........................................................ 709/201
See application file for complete search history.

(56) References Cited

U.S. PATENT DOCUMENTS

| 9,471,466 | B1 | 10/2016 | Garcia |
|---|---|---|---|
| 2008/0243848 | A1 | 10/2008 | Vedula |
| 2010/0174774 | A1 | 7/2010 | Kern et al. |
| 2011/0314148 | A1 | 12/2011 | Petersen et al. |
| 2015/0180963 | A1* | 6/2015 | Luecke .................. H04L 67/327 709/203 |
| 2016/0173486 | A1* | 6/2016 | Abbott ................ G06F 21/6245 713/175 |

FOREIGN PATENT DOCUMENTS

WO    2016137435 A1    9/2016

OTHER PUBLICATIONS

Mell et al., "The NIST Definition of Cloud Computing", Recommendations of the National Institute of Standards and Technology, Special Publication 800-145, Sep. 2011, 7 pages.

\* cited by examiner

*Primary Examiner* — Sibte H Bukhari
(74) *Attorney, Agent, or Firm* — Brian D. Welle (57) ABSTRACT

A method, system, and computer program product may generate synchronous application logs. A client device may create a session with a server, and the client device may be granted privileges to receive a backend service log associated with the session. A socket accompanying the session may be created between the client and server for communicating the backend service log. The requests from the client device may be monitored at the server, and log information related to the requests may be extracted by the backend service associated with the backend service log. The extracted log information may be transferred, via the socket, to the client device.

15 Claims, 7 Drawing Sheets

SYNCHRONOUS CLIENT-SIDE LOG SERVICE

BACKGROUND

The present disclosure relates generally to the field of application logging, and more particularly to a backend service for synchronous web application logging.

Obtaining accurate web application logs in a timely manner is important for developers and support teams, especially when troubleshooting problems that occur after the web application has been released to end users. Traditionally, relevant logs are compiled after a problem has been reported, which necessarily entails system administrators sifting through large quantities of potentially irrelevant log data.

SUMMARY

Disclosed herein are embodiments of a method, system, and computer program product for synchronous web application logging.

A method, system, and computer program product may generate synchronous application logs. A client device may create a session with a server, and the client device may be granted privileges to receive a backend service log associated with the session. A socket accompanying the session may be created between the client and server for communicating the backend service log. The requests from the client device may be monitored at the server, and log information related to the requests may be extracted by the backend service associated with the backend service log. The extracted log information may be transferred, via the socket, to the client device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to application logging, and more particularly to a backend service for synchronous web application logging. While the present disclosure is not necessarily limited to such applications, various aspects of the disclosure may be appreciated through a discussion of various examples using this context.

An understanding of the embodiments of the present disclosure may be aided by describing examples of a Business Rule Management System (BRMS), such as IBM iLog®. Such as examples are intended to be illustrative, and not limiting in any sense.

A BRMS may include software used to define, deploy, execute, monitor, maintain, and adjust a variety of decision logic (e.g., rules) used by various systems within the digital infrastructure of an organization or enterprise. To efficiently execute, monitor, maintain, and adjust this infrastructure, accurate and timely application logs are produced. This may be particularly important for developers or support teams when troubleshooting web applications that have already been deployed to end users.

The traditional process for maintaining/adjusting a particular application may include: 1) developers prepare a guide for collecting logs, according to the issue/problem; 2) system administrators configure a suitable log level in the backend server to collect log data; 3) once collected, the logs are sent to the developers for analysis; and 4) the developers analyze the logs and generate a solution/fix for the issue/problem.

Limitations with the traditional process may include: 1) complicated communications (e.g., multiple connections/sessions with multiple users) may cause confusion as to which end user's requests caused a particular action at the server and/or data layer; 2) system administrators' adjustment of global log settings may cause decreased performance and/or cause unintended effects (e.g., side effects/unforeseen complications); 3) developers may need to devote significant time, effort, and resources to filtering out "noise" (e.g., irrelevant log data), as the log data may include the requests and other log data for end user sessions that experienced no problems; and 4) if the problem occurs at a backend service (e.g., a third-party database or other section of the data layer), then the log collection process may need to be duplicated to ensure that the issue does not lie with the server-to-data layer interaction, as opposed to the end user-to-server interaction.

Embodiments of the present disclosure provide a new method to provide synchronous/instantaneous logging of a web application system. According to embodiments, whenever an end user takes an action (e.g., submits a request to the server), the synchronous logging system may monitor and log the required data in real-time, according to session ID, as the requests travel from the end user's client device, to the server, to any backend service or data layer components, back to the client device, and provide the log data either back to the end user, or store the information for later retrieval and analysis by the developers.

Embodiments of the present disclosure may include, for example, a process wherein an end user (in this case, a developer) in a web application system is granted access to receive backend server logs. When the end user creates the session with the server, a new socket (e.g., secondary connection/logging socket) may be generated and dedicated for the collection of log data. At the backend service side, once the access verification has taken place, the backend service/server may communicate with a BRMS (e.g., iLog®). During this interactive phase, the session ID may be saved to thread local so that whenever the service side thread needs to output log information, the iLog® can get the session ID from thread local and use it to retrieve the service-side WebSocket and send out the log information. The BRMS may transfer the log data to the end user (e.g., via iLog® Print) in real time (e.g., simultaneously as the end user's requests are processed).

According to embodiments, if there is more than one backend service involved (e.g., a complex hybrid cloud situation), the backend service may pass the log request, along with any required parameters/permissions, to each callee one-by-one, then the callee may return the log messages to the caller one-by-one. This may allow the log data to be posted, according to the particular end user session, by the backend service via the logging socket, either to the end user (e.g., a developer, in this case), or stored for later analysis (e.g., when the end user is a third party actor).

Lastly, because the logging socket is a secondary connection associated with the end user's original connection, the generation and termination of the logging socket may be fully automated.

As discussed above, aspects of the disclosure may relate to the field of application logging, and more particularly to a backend service for synchronous web application logging. Accordingly, an understanding of the embodiments of the present disclosure may be aided by describing examples of a Business Rule Management System (BRMS), such as IBM iLog®, and an example of a method for implementing embodiments of the present disclosure.

Figure 1:
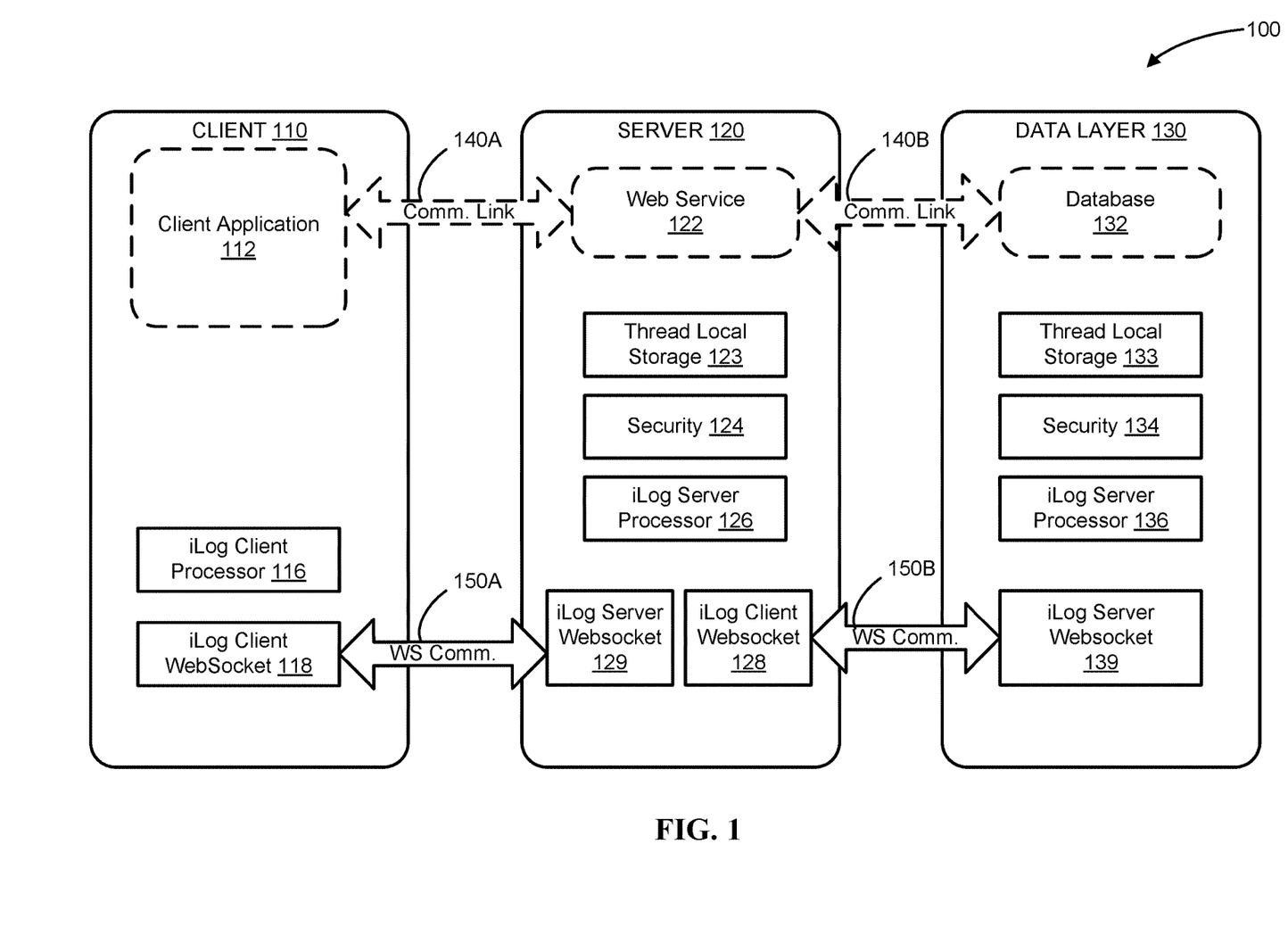
FIG. 1 illustrates an example architecture diagram, according to embodiments of the present disclosure.

Referring now to FIG. 1, illustrated is an example architecture environment 100 diagram, according to embodiments. In embodiments, architecture environment 100 may be implemented using, but not necessarily exclusive to, iLog® standards and components. In embodiments, the architecture environment 100 may include a client 110, a server 120, and a data layer 130. In some embodiments, functions of client 110, a server 120, and a data layer 130 may be implemented using a single, or varied number of, device(s) (such as computer system 501, shown in FIG. 5).

According to embodiments, the client 110, server 120, and a data layer 130 may be, or include, computer systems. The client 110, server 120, and a data layer 130 may include one or more iLog® processors, such as iLog® client processor 116, iLog® server processor 126, and iLog® server processor 136, respectively. The client 110 and the server 120 may be configured to communicate with each other through an internal or external network interface represented by communication link 140A and WebSocket (WS) communication 150A. Similarly, server 120 and data layer 130 may be configured to communicate with each other through an internal or external network interface represented by communication link 140B and WS communication 150A. The communication links 140A/B and WS 150A/B may be established using, e.g., modems, wireless network adapters, Ethernet adapters, etc. The client 110 and/or the server 120 may be equipped with a display or monitor. Additionally, the client 110 and/or the server 120 may include optional input devices (e.g., a keyboard, mouse, scanner, or other input device), and/or any commercially available or custom software (e.g., browser software, communications software, BRMS software, iLog® software, search engine, and/or web crawling software, filter modules for filtering content based upon predefined parameters, etc.). In some embodiments, the client 110, server 120 and/or the data layer 130 may be servers, desktops, laptops, or hand-held devices.

The client 110, server 120, and data layer 130 may be distant from each other and may communicate over a network using communication links 140A/B and WS 150A/B. In embodiments, the server 120 may be a central hub from which a client 110, data layer 130, and other remote devices (not pictured) can establish a communication connection, such as in a client-server networking model. In some embodiments, the server 120, client 110, and data layer 130 may be configured in any other suitable network relationship (e.g., in a peer-to-peer configuration or using another network topology).

In embodiments, the communication links 140A/B and WS 150A/B can be implemented using any number of any suitable communications media. For example, the communication links 140A/B and WS 150A/B may utilize a wide area network (WAN), a local area network (LAN), the Internet, or an intranet. In certain embodiments, the client 110, server 120, and data layer 130 may be local to each other, and communicate via any appropriate local communication medium. For example, the client 110 and the server 120 may communicate using a local area network (LAN), one or more hardwire connections, a wireless link or router, or an intranet. In some embodiments, the client 110, server 120, the data layer 130, and any other devices may be communicatively coupled using a combination of one or more networks and/or one or more local connections. For example, the client 110 may be hardwired to the server 120 (e.g., connected with an Ethernet cable), while the server 120 and the data layer 130 may communicate using a network (e.g., over the Internet).

In some embodiments, the communication links 140A/B and WS 150A/B can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources (e.g., over the Internet).

In embodiments, client 110 may include, for example, a client application 112, an iLog® client processor 116, and an iLog® client WebSocket 118. Client application 112 may be any web application for which logging data will be collected, as described herein. Client application 112 may utilize any suitable application platform (e.g., Java Script, ASPX, HTML, AJAX, etc.). iLog® client processor 116 may, according to embodiments, be a dedicated processor to service the WebSocket connection, or the iLog® client processor 116 may be shared among any and all components of client 110.

iLog® client WebSocket 118 may provide a persistent, full duplex (e.g., two-way) connection between client 110 and server 120 for the purpose of transferring log data associated with a web application 112 that is utilizing communication link 140A. While iLog® client WebSocket 118 is described in terms of iLog® software utilizing a WebSocket protocol, the present disclosure anticipates that alternative BRMS software and communication protocols could potentially be used. As such, the present disclosure should not be interpreted as being limited to iLog® and WebSocket embodiments.

In embodiments, server 120 may include, for example, web service 122, thread local storage 123, security 124, iLog® server processor 126, iLog® server WebSocket 129, and iLog client Websocket 128. Web Service 122 may be any web application service, servicing client application 112, for which logging data will be collected, as described herein.

In embodiments, thread local storage 123 may include, for example, a physical local memory device, or it may be a virtualized storage device either local to, or distributed remotely from, server 120. Thread local storage 123 may be utilized for storing session IDs, logging data, or any other information required.

Security 124 may include encryption modules, handshake algorithms, keys, access privilege lists, etc. required to ensure that an end user using client 110 is an authorized and trusted end user of web application 112. Security 124 may include a second set of security measures (e.g., encryption modules, handshake algorithms, keys, access privilege lists, etc.) needed to establish WebSocket communication 150A and utilize the synchronous web application logging method(s) described herein.

iLog® server processor 126 may, according to embodiments, be a dedicated processor to service the WebSocket connections, or the iLog® server processor 126 may be shared among any and all components of server 120. In embodiments, iLog® server processor 126 may include a plurality of processors and/or processor cores.

iLog® server WebSocket 129 may provide a persistent, full duplex (e.g., two-way) connection between client 110 and server 120 (e.g., using WebSocket communication 150A) for the purpose of transferring log data associated with a web application 112 that is utilizing communication link 140A.

iLog® client WebSocket 128 may provide a persistent, full duplex (e.g., two-way) connection between server 120 and data layer 130 (e.g., using WebSocket communication 150B) for the purpose of transferring log data associated with a web service 122 that is utilizing communication link 140B.

In embodiments, data layer 130 may include, for example, database 132, thread local storage 133, security 134, iLog® server processor 136, and iLog® server WebSocket 139. Database 132 may be any database used to service client application 112, for which logging data will be collected, as described herein. In embodiments, data layer 130 may be fully incorporated within server 120. In yet other embodiments, data layer 130 may be fully separate and apart from server 120, and may be included in a single, third-party managed server. In yet other embodiments, data layer 130 may be distributed across a plurality of servers and/or cloud platforms and services.

In embodiments, thread local storage 133 may include, for example, a physical local memory device, or it may be a virtualized storage device either local to, or distributed remotely from, a server hosting data layer 130. Thread local storage 133 may be utilized for storing session IDs, logging data, and/or hosting database 132, or any other information required.

Security 134 may include some or all of encryption modules, handshake algorithms, keys, access privilege lists, etc. (not shown) to ensure that an end user using client 110, and communicating with data layer 130 via server 120, is an authorized and trusted end user of web application 112.

Security 134 may include a third set of security measures (e.g., encryption modules, handshake algorithms, keys, access privilege lists, etc.) needed to establish WebSocket communication 150B and utilize the synchronous web application logging method(s) described herein.

iLog® server processor 136 may, according to embodiments, be a dedicated processor to service the WebSocket connections, or the iLog® server processor 136 may be shared among any and all components of data layer 130. In embodiments, iLog® server processor 136 may include a plurality of processors and/or processor cores.

iLog® server WebSocket 139 may provide a persistent, full duplex (e.g., two-way) connection between server 120 and data layer 130 (e.g., using WebSocket communication 150B) for the purpose of transferring log data associated with a web application 112, and web service 122, that is utilizing communication link 140B. In embodiments where data layer 130 is distributed across a plurality of cloud platforms, communication link 140B and WebSocket communication 150B may be representative of a plurality of communication protocols among the appropriate servers.

It is noted that FIG. 1 is intended to depict the representative major components of an example architecture environment 100. In some embodiments, however, individual components may have greater or lesser complexity than as represented in FIG. 1, components other than or in addition to those shown in FIG. 1 may be present, and the number, type, and configuration of such components may vary.

Figure 2:
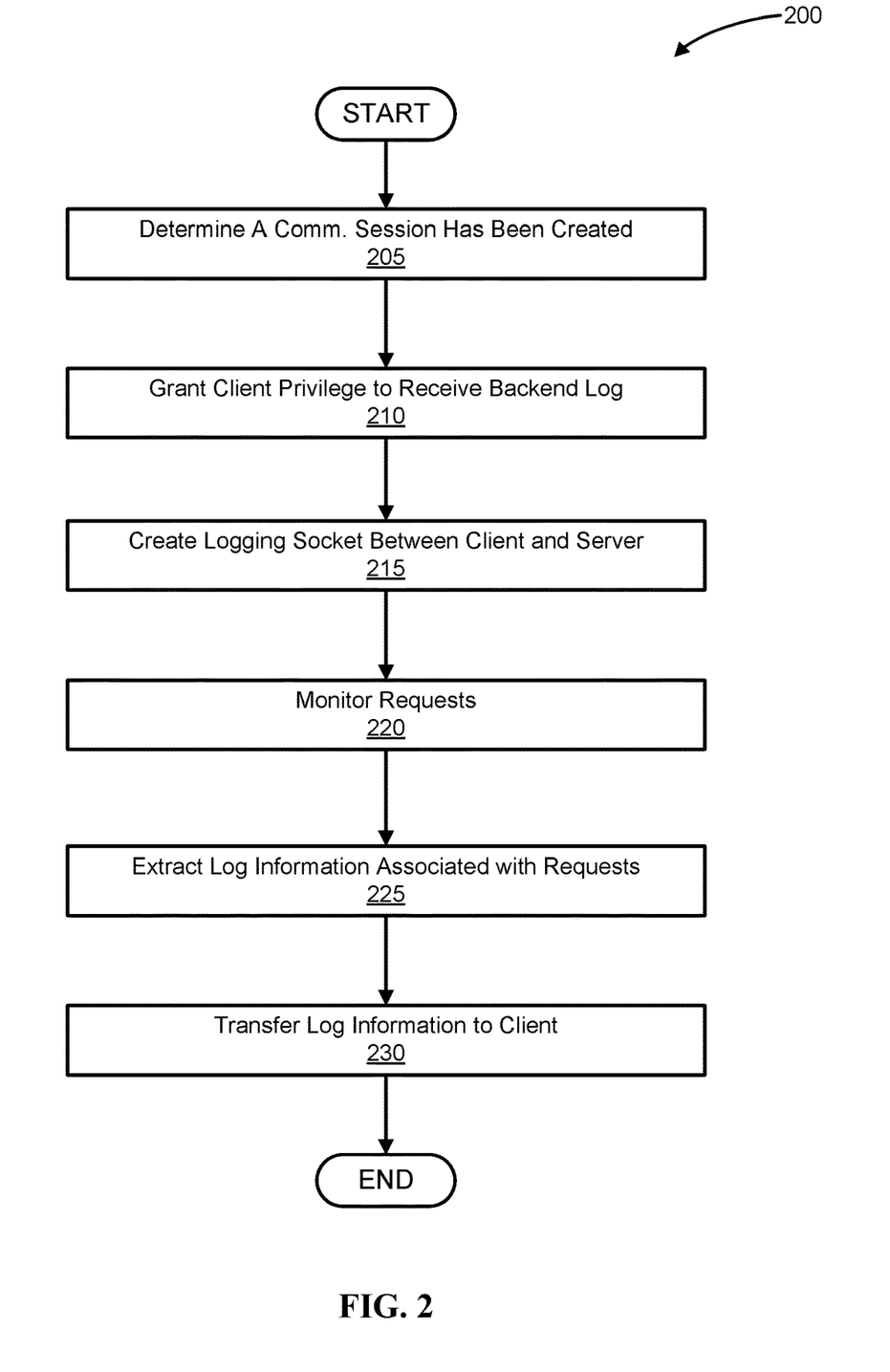
FIG. 2 illustrates a flowchart of a method for synchronously providing web application log data, according to embodiments of the present disclosure.

Referring now to FIG. 2, illustrated is a flowchart of a method 200 for synchronously providing web application log data, according to embodiments. At 205, it is determined that a communication session has been created. In embodiments, the communication session may be comparable to the establishment of communication link 140A/B of FIG. 1.

At 210, the client is granted privileges to receive a backend log. In embodiments, the client may be a developer or other end user attempting to solve a problem or bug in a web application. Privileges may be granted in response to a secured authentication of the end user.

At 215, a logging socket may be created between the client and the server. In embodiments, the logging socket may be comparable to the establishment of WebSocket communication 150A/B of FIG. 1.

At 220 the client requests are monitored. In embodiments, monitoring requests may include storing a list of requests and their contents in a database, table, data tree, etc. according to the session ID of the communication session created at 205.

At 225, log information associated with the requests is extracted. In embodiments, log information may include, for example, the OS version of the client and any servers involved in processing the request. The log information may further include information regarding hardware (e.g., the make/model/specifications of a CPU/memory/network adapter, or any other piece of hardware involved in processing a request), firmware, middleware, communication protocols, communication routes (e.g., which intermediate servers were utilized to transfer data packets), and any other measurable information associated with the processing of the relevant client request. The log information may be extracted as the client request is processed through the server and/or data layer. In embodiments, more efficient data extraction may potentially be performed using parallelism (e.g., single instruction, multiple data (SIMD)) to extract data from multiple pieces of hardware/software/middleware/firmware simultaneously, and synchronously with the processing of the client request.

At 230, the log information is transferred to the client synchronously with the acknowledgement of the processed request. In embodiments, the log information may be combined/grouped, according to session ID, and then transferred using a dedicated WebSocket communication link, as described herein. In embodiments, the method may further include detecting that communication between the client and server have ceased and terminating the WebSocket connection (not shown).

Figure 3:
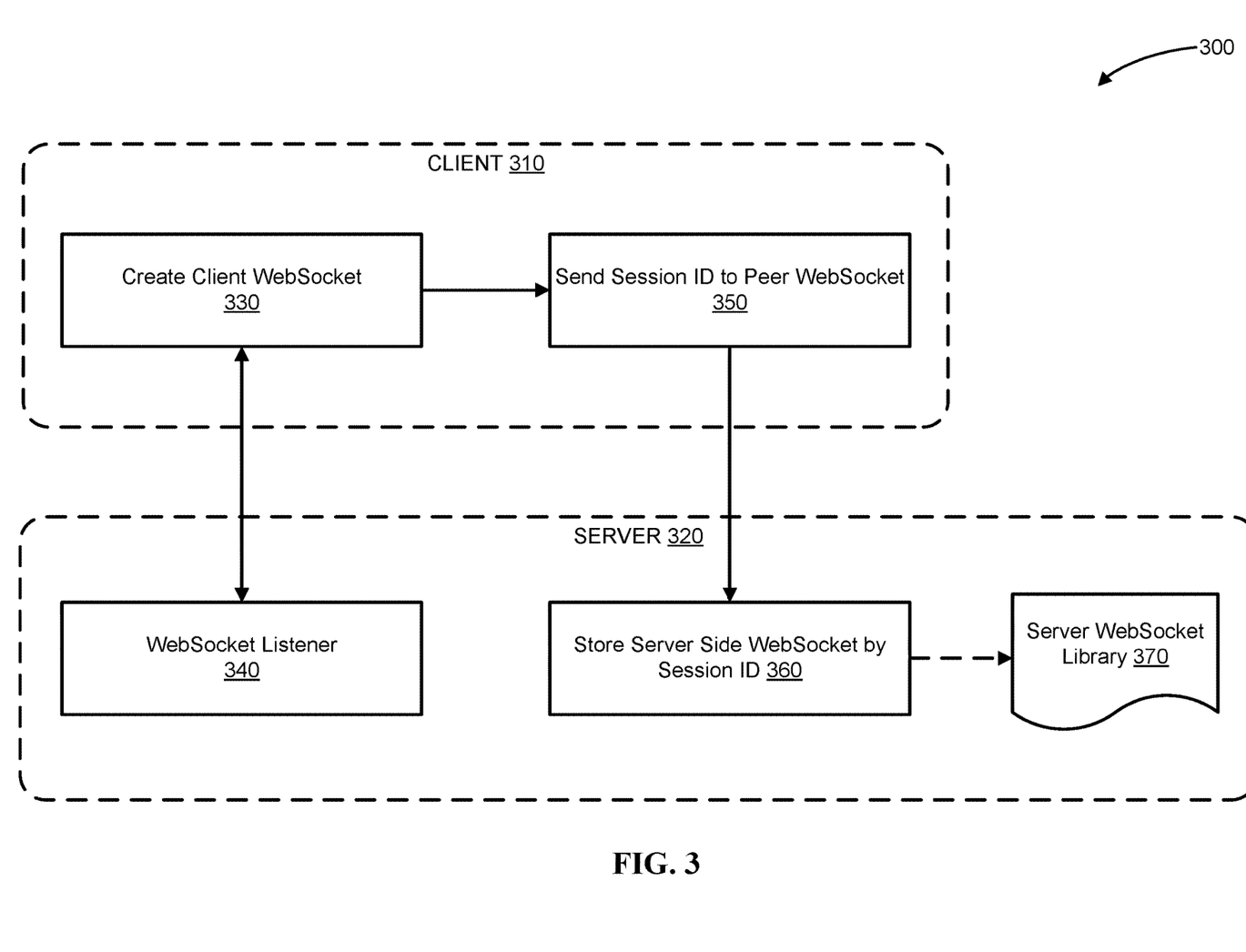
FIG. 3 depicts a workflow diagram for the initialization of synchronous web application logging, according to embodiments of the present disclosure.

Referring now to FIG. 3, illustrated is a workflow diagram 300 for the initialization of synchronous web application logging, according to an embodiment of the present invention. In embodiments, client 310 may be comparable to client 110 of FIG. 1.

At 330, the client 310 may create a client WebSocket (e.g., logging socket). This may be substantially similar to the process described at 215 of FIG. 2. For example, in response to determining that the client 310 has established a communication link with server 320, a logging socket (e.g., a second communication link/protocol) may be established between the client and server for the purposes of transferring log data. In embodiments, this may be handled by a WebSocket listener 340 at the server 320.

In embodiments, WebSocket listener 340 may further cause an additional logging socket connection between the server 320 and a data layer (not pictured), substantially similar to the WS communication 150B of FIG. 1.

At 350, the session ID is sent to the peer WebSocket at server 320. At 360, the server-side WebSocket is stored at WebSocket library 370, according to the session ID. In this way, a WebSocket communication protocol for passing/transferring log data between the client 310 and server 320 is established in tandem (e.g., synchronously/simultaneously) with the original communication link, which is utilized to communicate requests and responses between the web application and the application service, such as the web application 112 and web service 122 of FIG. 1.

Figure 4:
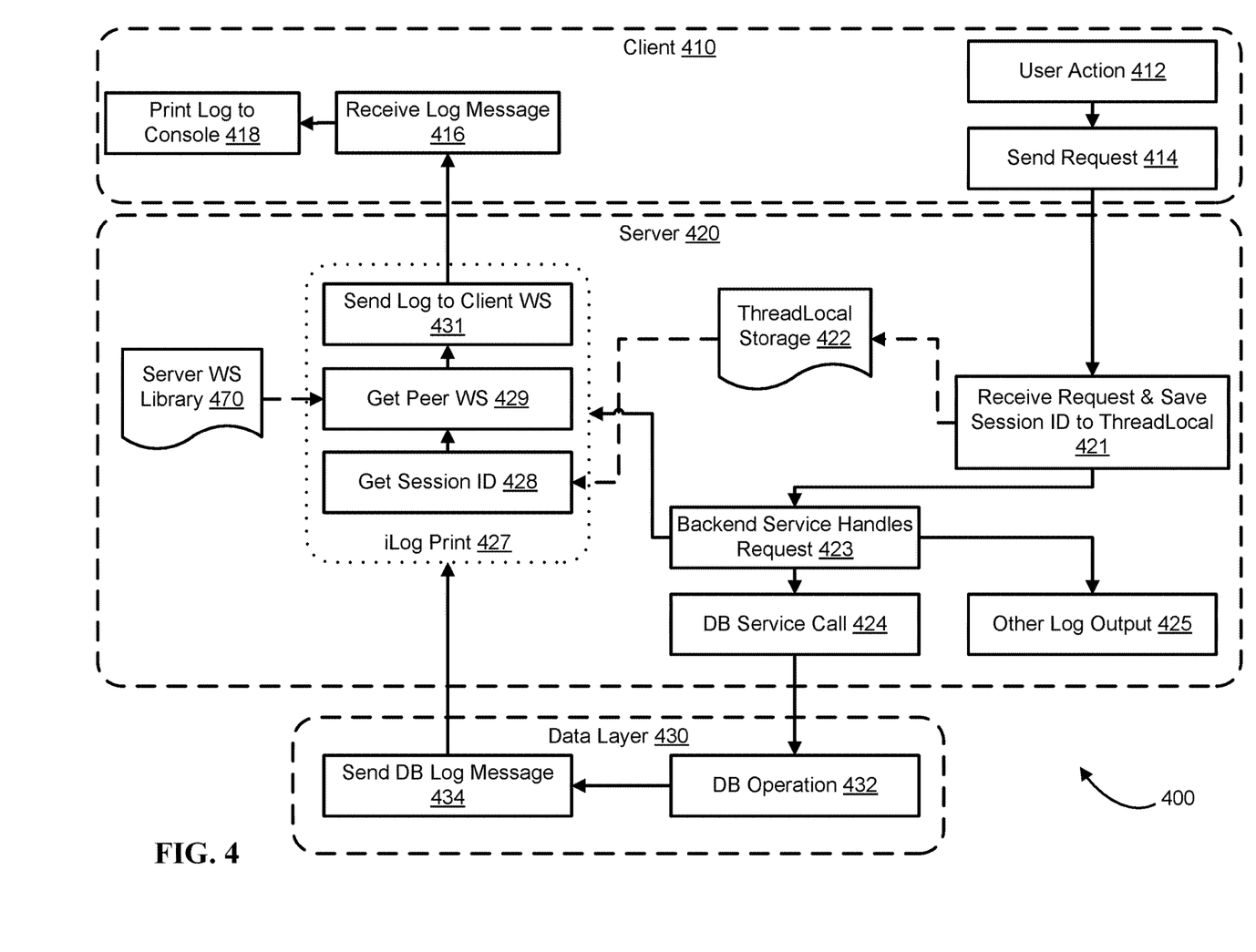
FIG. 4 depicts a workflow diagram for the interaction phase of synchronous web application logging, according to embodiments of the present disclosure.

Referring now to FIG. 4, illustrated is a workflow diagram 400 for the interaction phase of synchronous web application logging, according to an embodiment of the present disclosure. Client 410 may be substantially similar to, for example, client 110 of FIG. 1 and/or client 310 of FIG. 3. Server 420 may be substantially similar to, for example, server 120 of FIG. 120 and/or server 320 of FIG. 3. Data layer 430 may be substantially similar to, for example, data layer 130 of FIG. 1.

Once the initialization phase is complete (e.g., the workflow of FIG. 3), an end user may perform actions within a web application at 412 (e.g., the end user may interact with the web application by clicking on a link or other interactive element within a web browser), which may generate a request for the corresponding web service.

At 414, the generated request is sent to the server hosting the web service associated with the web application. This may be realized using a communication link, such as communication link 140A of FIG. 1.

At 421, the server 420 receives the request and saves the session ID to ThreadLocal storage 422. ThreadLocal storage 422 may be substantially similar to thread local storage 123 of FIG. 1.

The request is handled/processed by a backend service at 423. This may: 1) generate a response to the request directly (e.g., the response may be sent to a BRMS component, such as iLog® Print 427); 2) generate database (DB) service call 424 for the data layer 430; and/or 3) generate additional log output 425 (e.g., log data and any other relevant information regarding the software, hardware, firmware, etc. of server 420 that was used in handling the request).

In embodiments where a DB service call is generated at 424, the call is passed to the data layer 430 using a WebSocket as described herein (e.g., WS communication 150B of FIG. 1). The DB operation associated with the call is performed at 432. This may include retrieving a particular data object, the storing of a particular data object, the processing of a request, etc. In embodiments where multiple service calls are contemplated, "a SB service call" may include a set of service calls.

At 434, the log message (e.g., log information associated with the DB call) is transferred back to the server 420 (e.g., again using WS communication 150B), in preparation for transfer back to the client or, in embodiments, storage for later analysis by a developer.

Once the request has been handled/processed (and the log information has been extracted/collected), iLog® Print gathers the log information, according to the session ID that was stored in ThreadLocal storage 422, at 428. iLog® Print may, at 429, obtain the necessary WS credentials from server WS library 470. At this point, the log data/information is ready to be sent to the client 410, synchronously with the response to the request that was sent at 414.

At 431, the log message is sent to the client 410 via the established WebSocket (e.g., WS communication 150A of FIG. 1), where it is received at 416. The log message is them printed/posted to the log console at 418. The workflow 400 may be performed in real time and in response to each request generated by the end user at 412.

Using the techniques described herein, a log message for every request may be generated simultaneously/synchronously with the handling of said request and either posted back to the client 410, or stored for later analysis by a developer, in real time. In this way, the "noise" described herein may be avoided and/or "pre-filtered" from the generated log(s), saving time and resources, and enhancing the troubleshooting and debugging processes.

Figure 5:
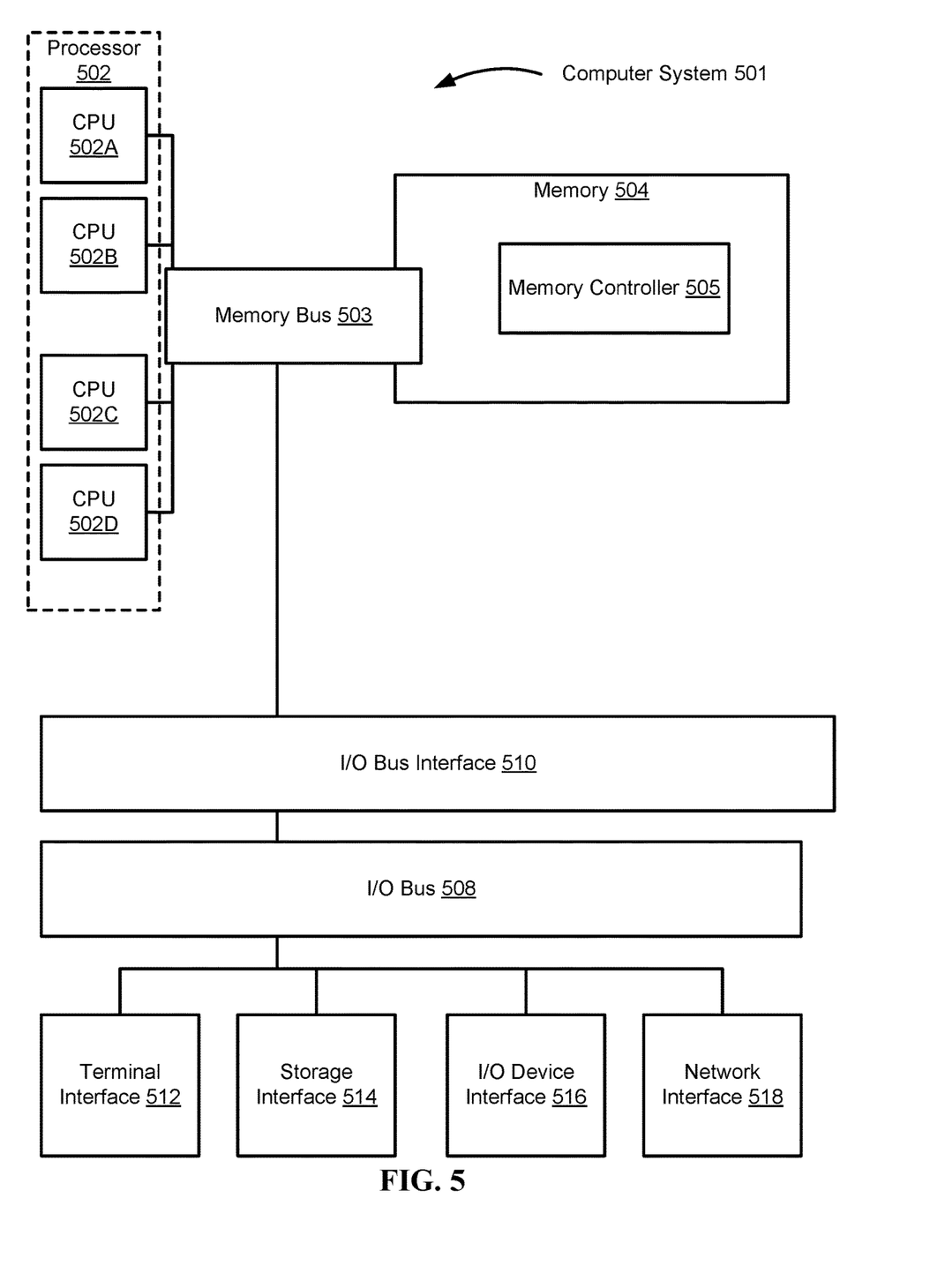
FIG. 5 depicts a high-level block diagram of an example computer system that may be used in implementing embodiments of the present disclosure.

Referring now to FIG. 5, shown is a high-level block diagram of an example computer system (e.g., computer) 501 that may be configured to perform various aspects of the present disclosure, including, for example, method 200, described in FIG. 2, and the workflows 300/400 of FIGS. 3/4. The example computer system 501 may be used in implementing one or more of the methods or modules, and any related functions or operations, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may comprise one or more levels of on-board cache.

In some embodiments, the memory subsystem 504 may comprise a random-access semiconductor memory, storage device, or storage medium (either volatile or non-volatile) for storing data and programs. In some embodiments, the memory subsystem 504 may represent the entire virtual memory of the computer system 501, and may also include the virtual memory of other computer systems coupled to the computer system 501 or connected via a network. The memory subsystem 504 may be conceptually a single monolithic entity, but, in some embodiments, the memory subsystem 504 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 504 may contain elements for control and flow of memory used by the CPU 502. This may include a memory controller 505.

Although the memory bus 503 is shown in FIG. 5 as a single bus structure providing a direct communication path among the CPUs 502, the memory subsystem 504, and the I/O bus interface 510, the memory bus 503 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an example computer system 501. In some embodiments, however, individual components may have greater or lesser complexity than as represented in FIG. 5, components other than or in addition to those shown in FIG. 5 may be present, and the number, type, and configuration of such components may vary.

In embodiments, the architecture environment, may be implemented in a cloud computing environment, as discussed herein. As such, a discussion of cloud computing environments may be beneficial.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
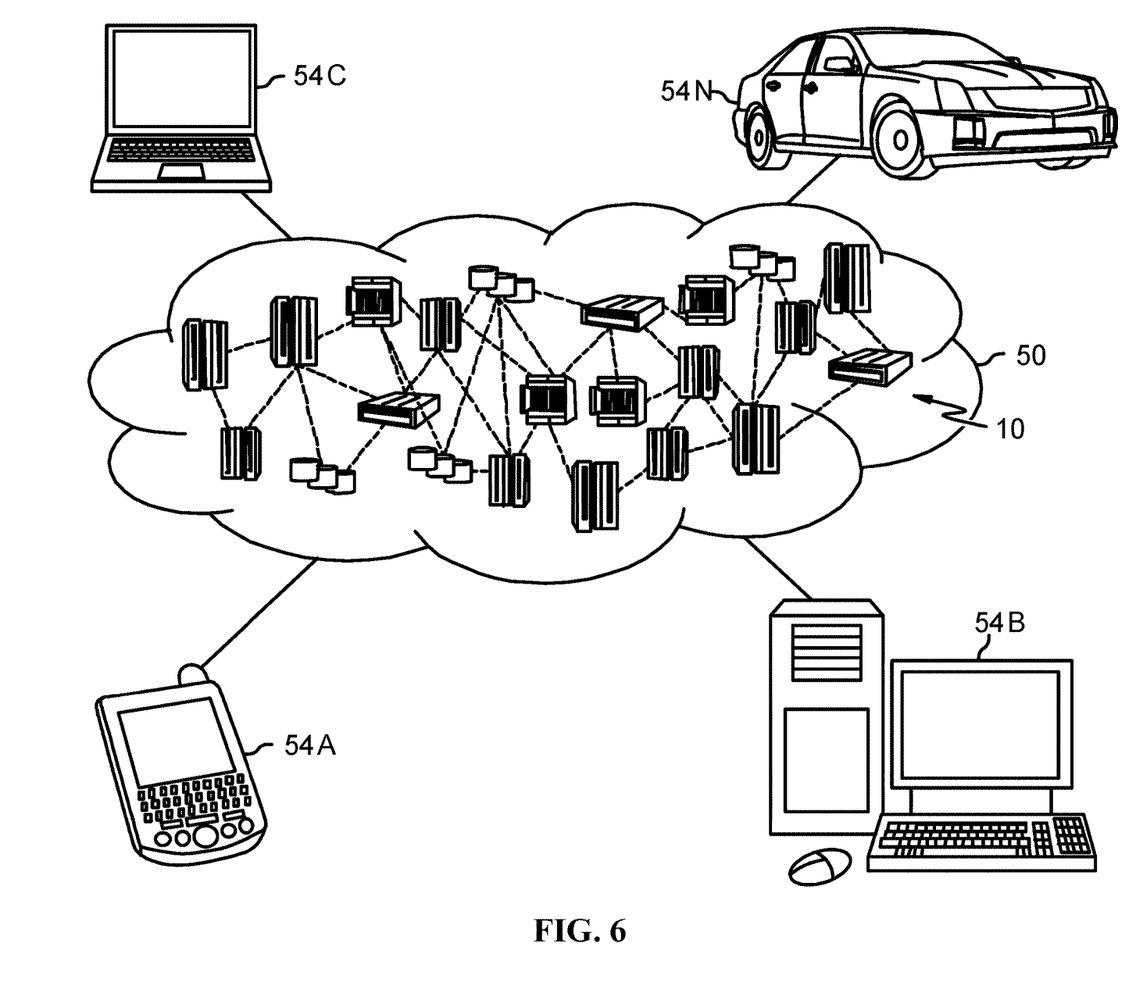
FIG. 6 depicts a cloud computing environment, according to embodiments.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
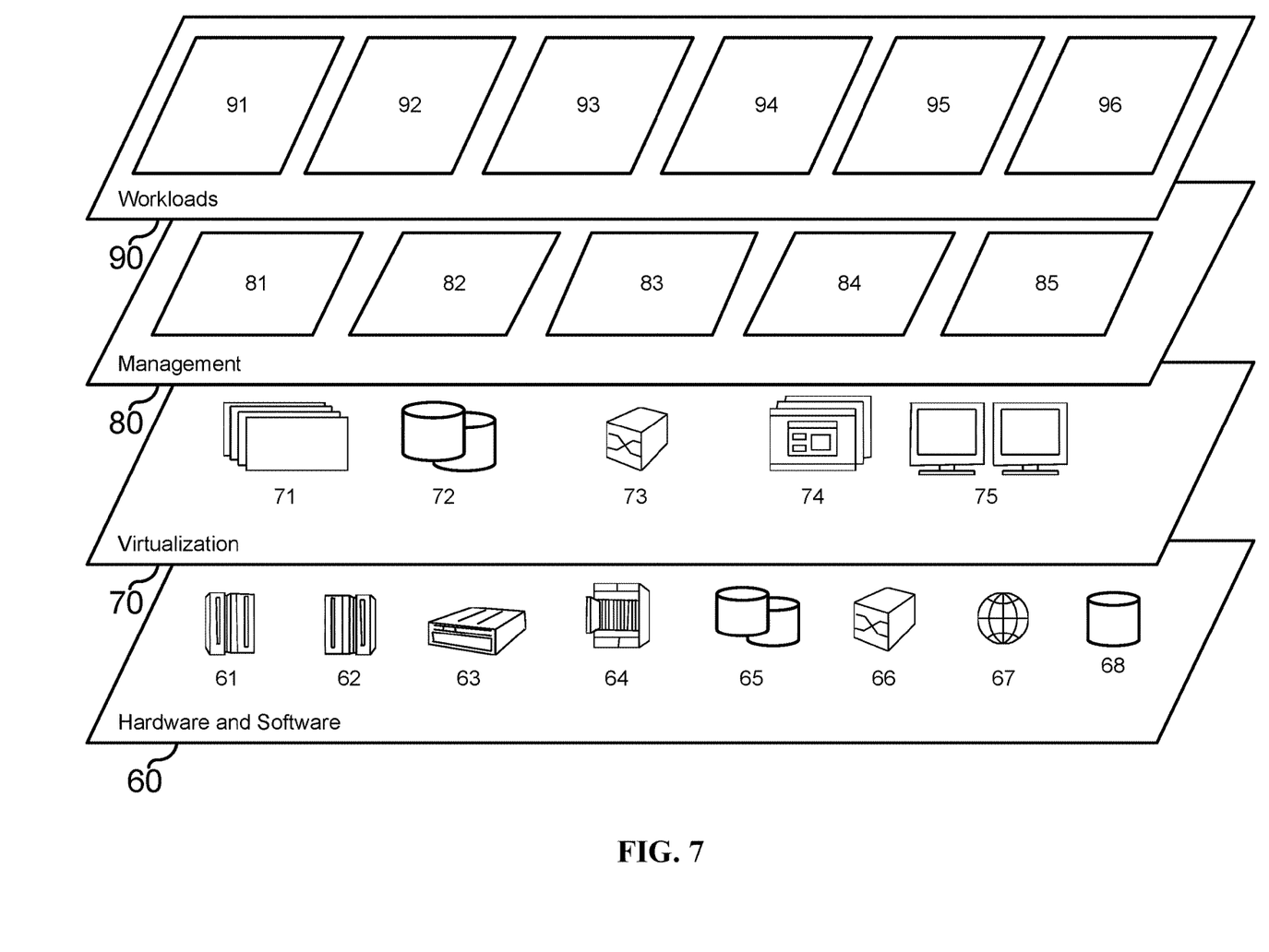
FIG. 7 depicts abstraction model layers, according to embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and synchronous client-side logging 96.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating synchronous application logs, comprising:

determining a client device of an end user has created a session with a server;

granting, to the client device, a privilege to receive a backend service log associated with the session;

creating a first socket between the client device and the server for communicating the backend service log, the first socket accompanying the session and dedicated for collection of log information associated with the client device during the session;

monitoring, during the session, a set of client device requests at the server, the set of client requests being a portion of a plurality of client device requests from a plurality of client devices, the plurality of client device requests being handled concurrently with the set of client requests;

extracting, by a backend service associated with the backend service log, log information related to the set of client device requests, wherein the extracted log information further includes information regarding a set of service calls, generated in response to the set of client device requests, to a database at a data layer and a set of database operations performed in response to the set of service calls;

transferring, via the first socket and synchronously with handling of the set of client device requests, the extracted log information to the client device, wherein the extracted log information is grouped according to a session identification when the extracted log information is transferred to the client device determining that the client device has ceased communicating with the server; and terminating the first socket; and creating a second socket that is between the server and the data layer.

2. The method of claim 1, wherein the first socket includes a WebSocket communication protocol.

3. The method of claim 1, further comprising displaying the extracted log information to the end user.

4. The method of claim 1, wherein software is provided as a service in a cloud environment to perform the method.

5. A system for generating synchronous application logs, comprising:

a memory with program instructions stored thereon; and a processor in communication with the memory, wherein the program instructions are executable by the processor to cause the system to:

determine a client device of an end user has created a session with a server;

grant, to the client device, a privilege to receive a backend service log associated with the session;

create a first socket between the client device and the server for communicating the backend service log, the first socket accompanying the session and dedicated for collection of log information associated with the client device during the session;

monitor, during the session, a set of client device requests at the server, the set of client requests being a portion of a plurality of client device requests from a plurality of client devices, the plurality of client device requests being handled concurrently with the set of client requests;

extract, by a backend service associated with the backend service log, log information related to the set of client device requests, wherein the extracted log information further includes information regarding a set of service calls, generated in response to the set of client device requests, to a database at a data layer and a set of database operations performed in response to the set of service calls;

transfer, via the first socket and synchronously with handling of the set of client device requests, the extracted log information to the client device, wherein the extracted log information is grouped according to a session identification when the extracted log information is transferred to the client device;

determine that the client device has ceased communicating with the server; and terminate the first socket; and create a second socket that is between the server and the data layer.

6. The system of claim 5, wherein the first socket includes a WebSocket communication protocol.

7. The system of claim 5, wherein the program instructions further cause the system to display the extracted log information to the end user.

8. A computer program product for generating synchronous application logs, the computer program product comprising a non-transitory computer readable storage medium having program instructions embodied therewith, the computer program product program instructions executable by a processor of a device to cause the processor to:

determine a client device of an end user has created a session with a server;

grant, to the client device, a privilege to receive a backend service log associated with the session;

create a first socket between the client device and the server for communicating the backend service log, the first socket accompanying the session and dedicated for collection of log information associated with the client device during the session;

monitor, during the session, a set of client device requests at the server, the set of client requests being a portion of a plurality of client device requests from a plurality of client devices, the plurality of client device requests being handled concurrently with the set of client requests;

extract, by a backend service associated with the backend service log, log information related to the set of client device requests, wherein the extracted log information further includes information regarding a set of service calls, generated in response to the set of client device requests, to a database at a data layer and a set of database operations performed in response to the set of service calls;

transfer, via the first socket and synchronously with handling of the set of client device requests, the extracted log information to the client device, wherein the extracted log information is grouped according to a session identification when the extracted log information is transferred to the client device;

determine that the client device has ceased communicating with the server; and terminate the first socket; and create a second socket that is between the server and the data layer.

9. The computer program product of claim 8, wherein the program instructions further cause the device to display the extracted log information to the end user.

10. The computer program product of claim 8, wherein, in response to creating the second socket, the session identification is saved to thread local.

11. The computer program product of claim 10, wherein transferring the extracted log information includes retrieving the session identification from thread local and using the session identification to identify the first socket.

12. The computer program product of claim 8, wherein the extracted log information further includes a make, a model, and a set of specifications for a first hardware component of the server.

13. The computer program product of claim 8, wherein the extracted log information further includes processor specifications, network adapter specifications, memory specifications, firmware information, middleware information, communication protocol information, and communication route information.

14. The computer program product of claim 8, wherein at least a portion of the extraction is performed using single instruction multiple data techniques.

15. The computer program product of claim 8, wherein the extracted log information is further stored for developer analysis.

* * * * *